US009380905B2

(12) United States Patent
Charles et al.

(10) Patent No.: US 9,380,905 B2
(45) Date of Patent: Jul. 5, 2016

(54) ELECTRIC KITCHEN APPLIANCE COMPRISING A PRESSING SCREW AND A PRE-CUTTING DEVICE

(75) Inventors: Patrick Charles, Louey (FR); Augustin Dominguez, Tarbes (FR)

(73) Assignee: SEB S.A., Ecully (FR)

( * ) Notice: Subject to any disclaimer, the term of this patent is extended or adjusted under 35 U.S.C. 154(b) by 779 days.

(21) Appl. No.: 13/518,398

(22) PCT Filed: Dec. 21, 2010

(86) PCT No.: PCT/FR2010/052860
§ 371 (c)(1),
(2), (4) Date: Sep. 5, 2012

(87) PCT Pub. No.: WO2011/077038
PCT Pub. Date: Jun. 30, 2011

(65) Prior Publication Data
US 2012/0325946 A1    Dec. 27, 2012

(30) Foreign Application Priority Data

Dec. 23, 2009  (FR) ..................................... 09 06323

(51) Int. Cl.
*A47J 19/06*    (2006.01)
*A47J 19/00*    (2006.01)

(52) U.S. Cl.
CPC ............... *A47J 19/06* (2013.01); *A47J 19/005* (2013.01)

(58) Field of Classification Search
CPC ........ A47J 19/06; A47J 43/046; A47J 19/005

USPC .................... 241/74, 92, 199.12; 99/510, 513
See application file for complete search history.

(56) References Cited

U.S. PATENT DOCUMENTS

| 1,443,535 | A |   | 1/1923 | Holmquist |
| 2,329,910 | A | * | 9/1943 | Johnson ......................... 241/74 |
| 4,602,543 | A | * | 7/1986 | Homma ......................... 83/355 |
| 5,537,918 | A | * | 7/1996 | Patel et al. ..................... 99/510 |
| 8,091,473 | B2 |  | 1/2012 | Kim |

FOREIGN PATENT DOCUMENTS

| DE |     920389 C   |   | 11/1954 |
| DE |     1185343    | * | 1/1965 |
| DE |     1185343 B  |   | 1/1965 |
| WO | 2007148872 A1  |   | 12/2007 |

OTHER PUBLICATIONS

Translation of DE1185343 Included As NPL—"1185343-TRANSLATION.PDF".*

* cited by examiner

*Primary Examiner* — Mark Rosenbaum
(74) *Attorney, Agent, or Firm* — The Webb Law Firm

(57) ABSTRACT

Provided is an electric kitchen appliance including a housing which contains an electric motor connected to an upper drive output, a work chamber comprising a work container sealed by a lid with a chute for inserting food, the work container having a discharge outlet, a removable pressing screw which can be rotated by the upper drive output being arranged in the work chamber. Rotation of the pressing screw is provided by a rotary element removably mounted in the work chamber, the rotary element including a pre-cutting disc and a driving member which is rotated by the upper drive output.

20 Claims, 3 Drawing Sheets

ELECTRIC KITCHEN APPLIANCE COMPRISING A PRESSING SCREW AND A PRE-CUTTING DEVICE

BACKGROUND OF THE INVENTION

1. Field of the Invention

The present invention relates to the technical field of electric kitchen appliances comprising a pressing screw arranged in a work container along an essentially vertical axis.

The present invention more particularly relates to electric kitchen appliances such as squeezers comprising a pressing screw associated with a filter element for making juices or pulps, and/or to choppers comprising a pressing screw associated with a rotary knife at the outlet for preparing minced foods.

2. Description of Related Art

Document WO 2007 148872 discloses an appliance comprising a pressing screw arranged along a vertical axis in a work container disposed on a motor housing. The upper end of the pressing screw could be thought of as a pre-cutting tool. However, this upper end of the pressing screw forms a substantial gap. The work container is sealed by a lid with a chute. Because of the substantial gap formed by the upper end of the pressing screw, an appliance of the aforementioned kind is subject to the safety standards for screw-type appliances, which are more stringent than the safety standards for automatic rotary knife-type appliances.

SUMMARY OF THE INVENTION

The object of the present invention is to better control access to the pressing screw while the appliance is in operation.

This object is achieved with an electric kitchen appliance comprising a housing containing an electric motor connected to an upper drive output, a work chamber comprising a work container sealed by a lid with a chute for inserting food, the work chamber having a discharge outlet, a removable pressing screw which can be rotated by the upper drive output being arranged in the work chamber, wherein the rotation of the pressing screw is provided by a rotary element removably mounted in the work chamber, said rotary element comprising a pre-cutting disc and a driving member arranged such as to be rotated by the upper drive output. The pressing screw therefore cannot be rotated by the upper drive output unless the pre-cutting disc is in the work chamber. The appliance cannot be used without the pre-cutting disc.

According to a preferred embodiment, the pre-cutting disc is rotatably connected to the pressing screw when the rotary element is positioned in the work chamber between the pressing screw and the chute for inserting food. Alternatively, a reducing device could in particular be arranged between the pre-cutting disc and the pressing screw.

According to a preferred embodiment, the pre-cutting disc comprises a passage for the cut-up food arranged between an upper cutting edge and a lower support edge. If desired, the pre-cutting disc can bear several cutting tools comprising an upper cutting edge. Alternatively, a passage for the cut-up food could in particular be formed on the perimeter of the pre-cutting disc, preferably on the perimeter of the chute.

According to a preferred embodiment, the work container is removably mounted on the housing. Alternatively, the housing could be integral with the work container.

According to an embodiment adapted for making juice or pulp, a filter element divides the work chamber into a first compartment containing the pressing screw and the pre-cutting disc and into a second compartment with the discharge outlet. According to a preferred embodiment, the pre-cutting disc is thus rotatably connected to the pressing screw when the rotary element is positioned in the first compartment between the pressing screw and the chute for inserting food.

According to an embodiment adapted for preparing minced foods, the pressing screw is arranged in a work container forming a conduit connecting the chute for inserting food to the discharge outlet, a grate and a rotary knife being arranged between the pressing screw and the discharge outlet.

According to a preferred embodiment, the filter element is removably mounted in the work container. Alternatively, the filter element could in particular be part of the work container. Advantageously, the filter element thus rests on a bottom wall of the work container. Alternatively or additionally, the filter element could in particular be supported on a side wall of the work container.

According to a preferred embodiment, the pressing screw rests on the filter element. Alternatively, the pressing screw could in particular rest on the work container.

According to a first embodiment, the rotary element is removable in relation to the pressing screw, the rotary element disposed on the pressing screw driving the latter in rotation. The pre-cutting disc belonging to the rotary element can thus be positioned in the work container independently of the pressing screw.

Advantageously, the rotary element thus rests on the pressing screw. This arrangement reduces the forces exerted on the rotary element.

Additionally or alternatively, the rotary element can rest on the upper drive output. This arrangement in particular allows the use of the pre-cutting disc without using the pressing screw.

According to a second embodiment, the pressing screw belongs to the rotary element. The pre-cutting disc is therefore integral with the pressing screw.

BRIEF DESCRIPTION OF THE DRAWINGS

The invention will be better understood by studying two non-limiting examples of embodiment illustrated in the appended figures, in which.

BRIEF DESCRIPTION OF THE INVENTION

Figure 1:
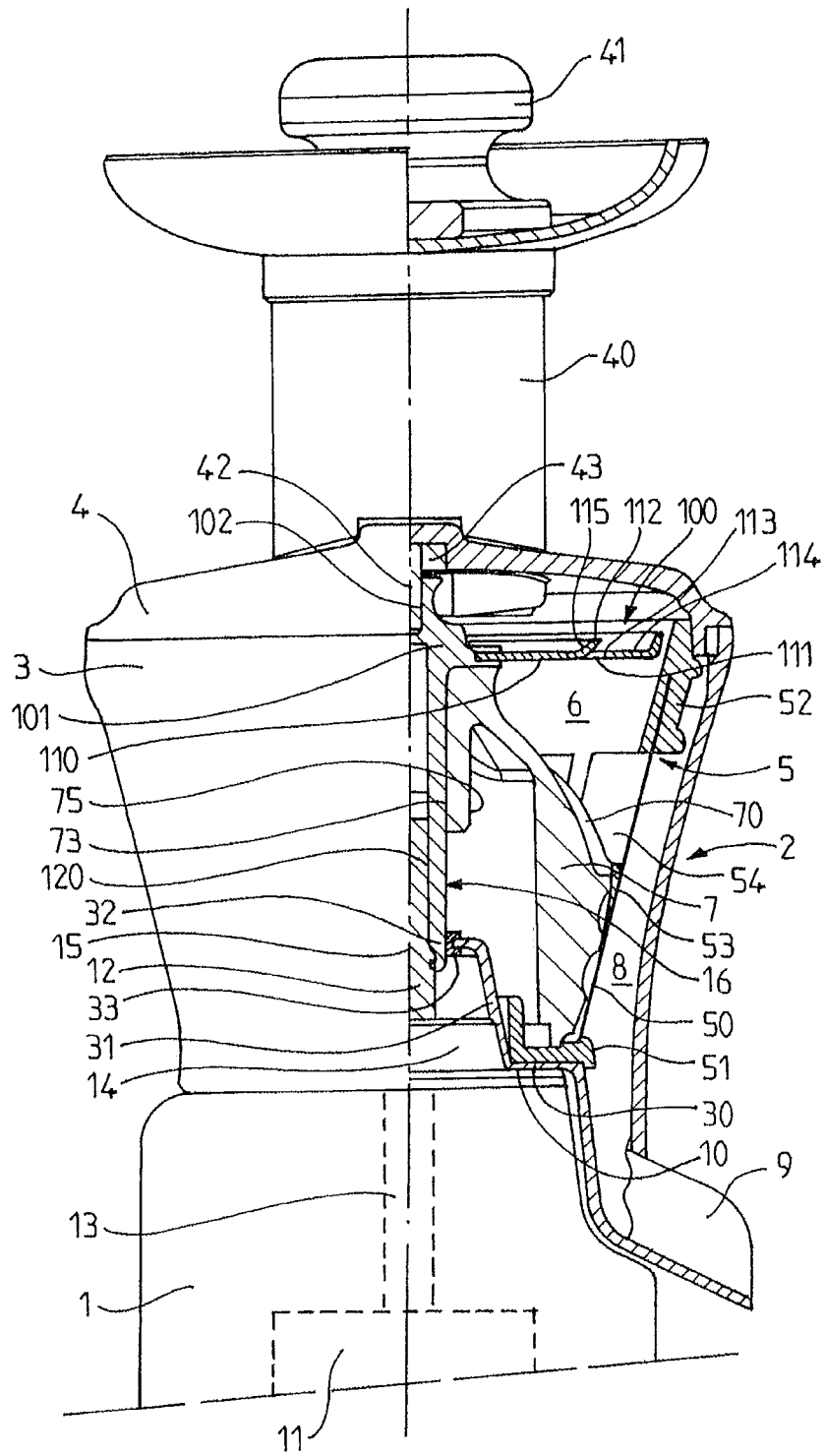
FIG. 1 illustrates an electric kitchen appliance according to a first embodiment of the invention, shown in elevation and in a partial cutaway view, with the housing containing the motor illustrated schematically.

The electric kitchen appliance illustrated in FIG. 1 comprises a housing 1 and a work chamber 2 comprising a work container 3 sealed by a lid 4. The work container 3 has a discharge outlet 9. A removable pressing screw 7 is arranged in the work chamber 2. A filter element 5 divides the work chamber 2 into a first compartment 6 containing the pressing screw 7 and a pre-cutting disc 110, and into a second compartment 8 with the discharge outlet 9.

Figure 5:
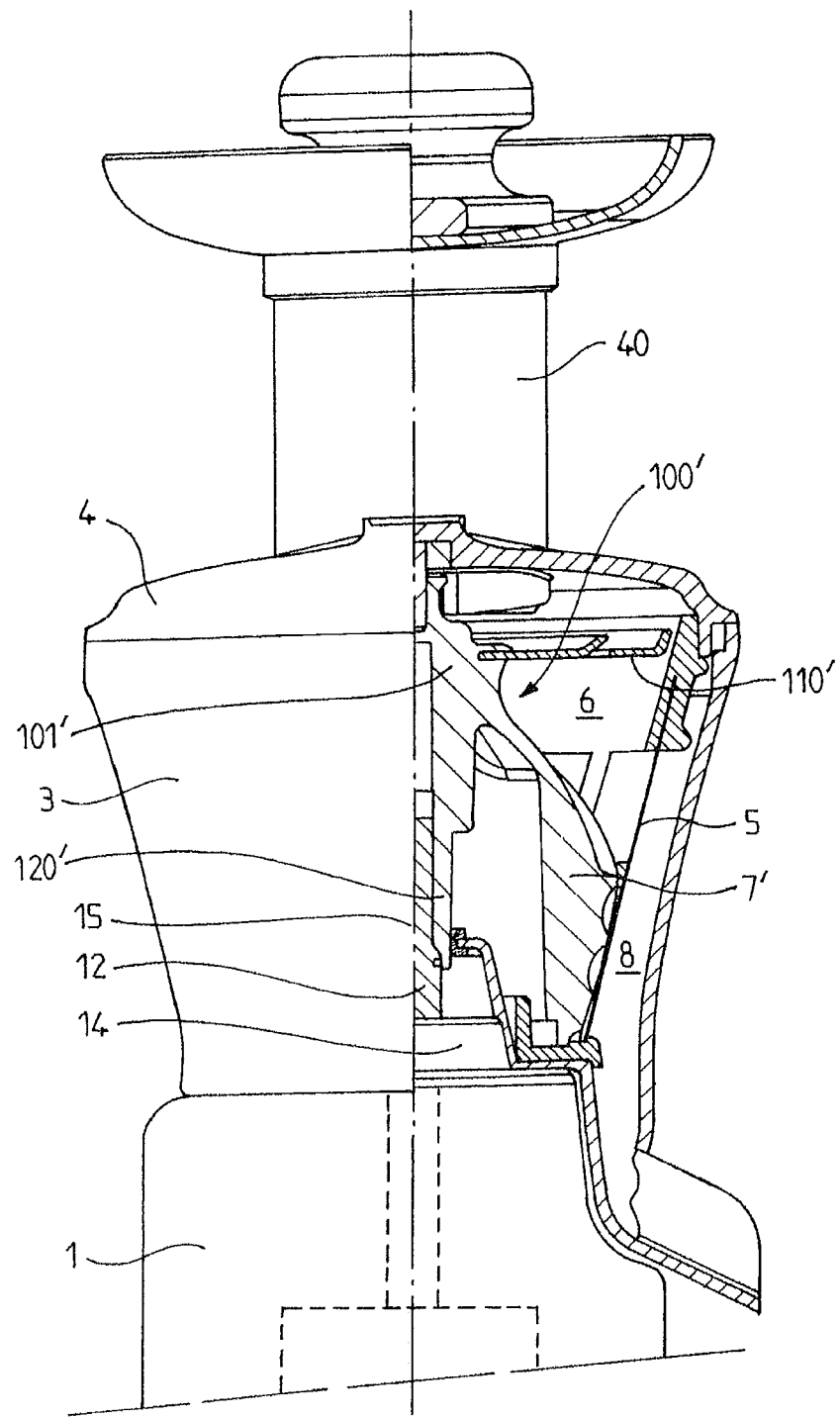
FIG. 5 illustrates an electric kitchen appliance according to a second embodiment of the invention, shown in elevation and in a partial cutaway view, with the housing containing the motor illustrated schematically.

The housing 1 forms a base 10 on which the work container 3 rests. The housing 1 contains an electric motor 11, illustrated schematically. The electric motor 11 is connected to an upper drive output 12, if desired by means of a transmission device 13, illustrated schematically. The upper drive output 12 is arranged on the base 10. More particularly, as can be discerned in FIGS. 1 and 5, the upper drive output 12 emerges from a protrusion 14 of the base 10. The upper drive output 12 is driven in rotation about an axis 15. As illustrated in FIGS. 1 and 5, the axis 15 is vertical.

In the example of embodiment illustrated in FIG. 1, the work container 3 is removably mounted on the housing 1. The filter element 5 is removably mounted in the work container 3.

The work container 3 has an upper opening sealed by the lid 4. The upper opening of the work container 3 thus allows the filter element 5 and the pressing screw 7 to be inserted and removed. The discharge outlet 9 is formed in a lower part of the work container 3 outside the filter element 5. The work container 3 has a bottom wall 30 comprising an axial boss 31 arranged such as to cover the protrusion 14.

The work container 3 is arranged for the passage of a transmission means 16 between the electric motor 11 and the pressing screw 7. To this end, the axial boss 31 has an axial opening 32. A gasket 33 is advantageously mounted in the axial opening 32 in order to form a seal with the transmission means 16.

The lid 4 can be fastened onto the work container 3 in particular by means of bayonet fittings (not illustrated in the figures). The lid 4 has a chute for inserting food 40. The chute for inserting food 40 is laterally disposed in relation to the axis of the pressing screw 7. A plunger 41 is arranged in the chute for inserting food 40. The lid 4 comprises an axial guide member 42 advantageously resiliently mounted in an elastic element 43.

The filter element 5 comprises at least one filtering part 50 arranged facing the pressing screw 7. The filter element advantageously comprises a base 51 and an upper crown 52, the filtering part 50 being arranged between the base 51 and the upper crown 52.

An intermediate ring 53 can be arranged between the base 51 and the upper crown 52. More particularly, the filtering part 50 is arranged between the base 51 and the intermediate ring 53. Another filtering part 54 is arranged between the intermediate ring 53 and the upper crown 52.

More particularly, the filter element 5 rests on the bottom wall 30 of the work container 3. The lid 4 secures the upper crown 52 of the filter element 5.

Figure 3:
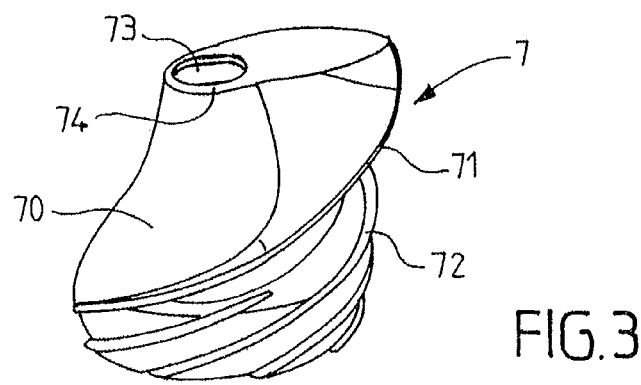
FIG. 3 shows the pressing screw of the appliance illustrated in FIG. 1.
Figure 4:
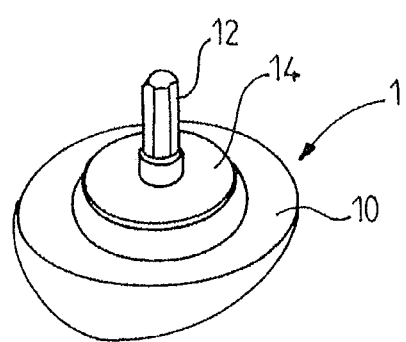
FIG. 4 shows the upper drive output and a part of the housing of the appliance illustrated in FIG. 1.

As can be discerned in FIGS. 1 and 3, the pressing screw 7 comprises a body 70 equipped with threads 71, 72 arranged for pushing the food against the filter element 5. The pressing screw 7 comprises an axial passage 73, which can be discerned in FIGS. 1 and 3.

More particularly, the pressing screw 7 rests on the filter element 5.

The removable pressing screw 7 can be rotated by the upper drive output 12. The rotation of the pressing screw 7 is provided by a rotary element 100 removably mounted in the work chamber 2. More particularly, the rotary element 100 is removably mounted in the first compartment 6. The rotary element 100 comprises the pre-cutting disc 110 and a driving member 120 arranged such as to be rotated by the upper drive output 12, if desired by a supplemental transmission means. The rotary element 100 can be removed from the first compartment 6 via the upper opening of the work container 3.

As shown in FIG. 1, the rotary element 100 comprises a hub 101.

The gasket 33 cooperates with the hub 101. Alternatively, the gasket 33 could in particular cooperate with the upper drive output 12 or with a cylindrical core 75 of the pressing screw 7.

Figure 2:
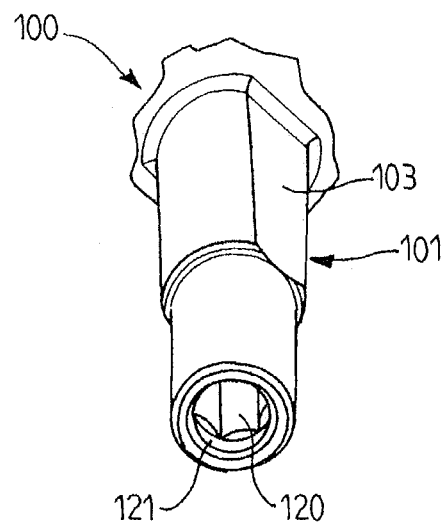
FIG. 2 shows the driving member of the rotary element of the appliance illustrated in FIG. 1.

As can be more readily discerned in FIG. 2, the driving member 120 is formed in an end of the hub 101.

As shown in FIG. 1, the pre-cutting disc 110 comprises a passage for minced food 111 arranged between an upper cutting edge 112 and a lower support edge 113. The lower support edge 113 extends to form a support surface 114 arranged such as to receive the food from the chute for inserting food 40.

The upper cutting edge 112 can be, for example, straight or convex. As the pre-cutting disc 110 rotates, the upper cutting edge 112 is arranged such as to slice food resting on the support surface 114.

Preference is given to the upper cutting edge 112 extending to form an upper wall 115 covering, at least partially, the passage for the cut-up food 111. Advantageously, the distance between the upper cutting edge 112 and the lower support edge 113 is less than 1 cm, and preferably less than 5 mm, in the plane perpendicular to the axis 15.

The pre-cutting disc 110 is non-detachably fastened to the hub 101 by any suitable means. The pre-cutting disc 110 can thus be made of metal, wherein the hub 101 can advantageously be made of plastic. The hub 101 can in particular be overmolded on the pre-cutting disc 110. Alternatively, the pre-cutting disc 110 can in particular be riveted to the hub 101.

The rotary element 100 comprises a recess 102 provided for receiving the axial guide member 42. The recess 102 is formed in the upper part of the hub 101.

In the example of embodiment illustrated in FIG. 1, the rotary element 100 is removable in relation to the pressing screw 7. The rotary element 100 disposed on the pressing screw 7 arranged in the first compartment 6 rotates said pressing screw 7.

FIG. 1 shows the rotary element 100 in position in the first compartment 6 between the pressing screw 7 and the chute for inserting food 40. More particularly, the rotary element 100 rests on the pressing screw 7.

In the absence of the pressing screw 7, the rotary element 100 rests on the upper drive output 12. To this end, the rotary element 100 has a lower support wall 121 arranged such as to rest on an upper support wall of the upper drive output 12.

The rotary element 100 has a driving formation 103, more readily discernible in FIG. 2, arranged such as to cooperate with an associated driving formation 74 of the pressing screw 7, more readily discernible in FIG. 3. More particularly, the driving formation 103 is formed on the hub 101 and the associated driving formation 74 is formed in the axial passage 73.

The appliance of the invention is used and operates in the following manner.

When the rotary element 100 is positioned in the first compartment 6 between the pressing screw 7 and the chute for inserting food 40, the upper drive output 12 is engaged with the driving member 120 of the rotary element 100 comprising the pre-cutting disc 110. The pre-cutting disc 110 is thus interposed between the chute for inserting food 40 and the pressing screw 7. The pressing screw 7 is not directly accessible.

The driving formation 103 of the rotary element 100 is engaged with the associated driving formation 74 of the pressing screw 7. The pre-cutting disc 110 is thus rotatably connected to the pressing screw 7 when the rotary element 100 is positioned in the working chamber 2 between the pressing screw 7 and the chute for inserting food 40. When the user inserts food into the chute for inserting food 40, the food is first pre-cut by the pre-cutting disc 110 before being pressed against the filter element 5 by the pressing screw 7.

The example of embodiment of FIG. 5 also shows a rotary element 100' comprising a pre-cutting disc 110' and a driving member 120' arranged such as to be rotated by the upper drive output 12. If desired, the driving member 120' can be rotated by the upper drive output 12 via a supplemental transmission means.

The example of embodiment of FIG. 5 differs from the example of embodiment of FIG. 1 in that the pressing screw 7' belongs to the rotary element 100'. The pressing screw 7' is thus integral with the hub 101' bearing the pre-cutting disc 110'. Hence the pre-cutting disc 110' is rotatably connected to the pressing screw 7' when the rotary element 100' is positioned in the work chamber 2 between the pressing screw 7' and the chute for inserting food 40. The driving member 120' of the rotary element 100' is formed on the hub 101'.

The pressing screw 7' rests on the filter element 5.

As shown in FIGS. 1 and 5, the pre-cutting disc 110, 110' is interposed between the pressing screw 7, 7' and the chute for inserting food 40, 40'. The pre-cutting disc 110, 110' positioned in the work chamber 2 prevents direct access to the pressing screw 7, 7'. The food inserted in the chute for inserting food 40, 40' is first cut by the pre-cutting disc 110, 110' and then pressed against the filter element 5 by the pressing screw 7, 7'. The pressing screw 7, 7' cannot be rotated unless the pre-cutting disc 110, 110' is in position.

As an alternative, the work container 3 may be integral with the housing 1.

As an alternative, the pre-cutting disc 110, 110' does not necessarily comprise just one upper cutting edge 112. The pre-cutting disc 110, 110' may bear several cutting tools comprising an upper cutting edge. The pre-cutting disc 110, 110' is not necessarily arranged for cutting food into slices. The pre-cutting disc 110, 110' can in particular be arranged for grating food.

As an alternative, the pre-cutting disc 110, 110' is not necessarily metal. In particular, the upper cutting edge 112 may be formed by a metal insert mounted on the pre-cutting disc 110, 110', wherein the pre-cutting disc 110,110' can then be part of the hub 101, 101'. Alternatively, the pre-cutting disc could be made of a resistant plastic material such as a reinforced polyamide and integrate the upper cutting edge 112.

As an alternative, the axis 15 is not necessarily aligned in the vertical direction, but may be aligned in an essentially vertical direction having an angle less than or equal to 45° in relation to the vertical direction.

As an alternative, the pressing screw 7, 7' could be arranged in a work chamber 3 forming a conduit connecting the chute for inserting food to the discharge outlet, a grate and a rotary knife being arranged between the pressing screw and the discharge outlet in order to chop the food compressed by the pressing screw 7,7'.

As an alternative, the work chamber 3 does not necessarily contain most of the pre-cutting disc 110, 110' and/or most of the pressing screw 7, 7' and/or most of the filter element 5.

The present invention is in no way limited to the examples of embodiment described here, but encompasses numerous modifications in the scope of the claims.

The invention claimed is:

1. Electric kitchen appliance comprising a housing containing an electric motor connected to an upper drive output, a work chamber comprising a work container having an upper opening sealed by a lid with a chute for inserting food, the work container having a discharge outlet, a removable pressing screw that can be rotated by the upper drive output being arranged in the work chamber, wherein the rotation of the pressing screw is provided by a rotary element removably mounted in the work chamber, said rotary element comprising a pre-cutting disc and a driving member arranged such as to be rotated by the upper drive output, wherein the pressing screw is rotated by the upper drive output only when the pre-cutting disc is in the work chamber, and wherein the upper opening of the work container allows the pressing screw to be inserted and removed.

2. Electric kitchen appliance as in claim 1, wherein the pre-cutting disc is rotatably connected to the pressing screw when the rotary element is positioned in the work chamber between the pressing screw and the chute for inserting food.

3. Electric kitchen appliance as in claim 2, wherein a filter element divides the work chamber into a first compartment containing the pressing screw and the pre-cutting disc and into a second compartment with the discharge outlet.

4. Electric kitchen appliance as in claim 2, wherein the pressing screw is integral with the rotary element.

5. Electric kitchen appliance as in claim 1, wherein the pre-cutting disc comprises a passage for the cut-up food arranged between an upper cutting edge of the pre-cutting disc and a lower support edge of the pre-cutting disc.

6. Electric kitchen appliance as in claim 5, wherein a filter element divides the work chamber into a first compartment containing the pressing screw and the pre-cutting disc and into a second compartment with the discharge outlet.

7. Electric kitchen appliance as in claim 5, wherein the pressing screw is integral with the rotary element.

8. Electric kitchen appliance as in claim 1, wherein the work container is removably mounted on the housing.

9. Electric kitchen appliance as in claim 8, wherein a filter element divides the work chamber into a first compartment containing the pressing screw and the pre-cutting disc and into a second compartment with the discharge outlet.

10. Electric kitchen appliance as in claim 8, wherein the pressing screw is integral with the rotary element.

11. Electric kitchen appliance as in claim 1, wherein a filter element divides the work chamber into a first compartment containing the pressing screw and the pre-cutting disc and into a second compartment with the discharge outlet.

12. Electric kitchen appliance as in claim 11, wherein the pressing screw is integral with the rotary element.

13. Electric kitchen appliance as in claim 11, wherein the filter element is removably mounted in the work container.

14. Electric kitchen appliance as in claim 13, wherein the pressing screw is integral with the rotary element.

15. Electric kitchen appliance as in claim 13, wherein the filter element rests on a bottom wall of the work container.

16. Electric kitchen appliance as in claim 15, wherein the pressing screw is integral with the rotary element.

17. Electric kitchen appliance as in claim 11, wherein the pressing screw rests on the filter element.

18. Electric kitchen appliance as in claim 1, wherein the rotary element is removable in relation to the pressing screw, the rotary element being disposed on the pressing screw driving the pressing screw in rotation.

19. Electric kitchen appliance as in claim 18, wherein the rotary element rests on the pressing screw.

20. Electric kitchen appliance as in claim 1, wherein the pressing screw is integral with the rotary element.

* * * * *